United States Patent

Standish

[19]

[11] Patent Number: 6,082,601
[45] Date of Patent: Jul. 4, 2000

[54] GUN STORAGE DEVICE

[76] Inventor: Thomas H. Standish, 4412 Buckelew Rd., Bloomfield, N.Y. 14469

[21] Appl. No.: 09/121,990

[22] Filed: Jul. 24, 1998

Related U.S. Application Data

[60] Provisional application No. 60/054,681, Aug. 4, 1997.

[51] Int. Cl.[7] .............................. B60R 7/04; B65D 55/14; F41C 33/06
[52] U.S. Cl. ...................... 224/569; 224/557; 224/42.25; 224/912; 206/317; 70/63; 70/164; 70/166; 70/203
[58] Field of Search .................................. 70/63, 69, 164, 70/166, 203, 229, 232; 224/557, 569, 912, 913, 42, 25; 206/317; 109/51, 52; 312/245; 220/315, 318; 211/64; 5/503, 507

[56] References Cited

U.S. PATENT DOCUMENTS

| | | | |
|---|---|---|---|
| 2,755,748 | 7/1956 | Abell, Jr. ..................................... | 70/63 |
| 3,464,606 | 9/1969 | Nordeen ................................... | 224/912 |
| 4,248,067 | 2/1981 | Sears .......................................... | 70/58 |
| 4,721,205 | 1/1988 | Burt et al. . | |
| 4,788,838 | 12/1988 | Cislo . | |
| 4,890,466 | 1/1990 | Cislo . | |
| 5,168,994 | 12/1992 | Beletsky et al. . | |
| 5,236,086 | 8/1993 | MacTaggart . | |
| 5,375,440 | 12/1994 | Patterson . | |

OTHER PUBLICATIONS

Brochure from R & D Enterprises, 9970 Mango Street, Phelan, CA 92371.
Brochure from American Security Products Co., 11925 Pacific Avenue, Fontana, CA 92335.
Brochure from Palmer Security Products, 2930 N. Campbell Avenue, Chicago, IL 60618.
"Ready Access Piston Cases" reprint from Gun Tests, May 1993.
Brochure from MPC, P.O. Box 7145, McMinnville, TN 37111–7145.

Primary Examiner—Linda J. Sholl
Attorney, Agent, or Firm—Jaeckle Fleischmann & Mugel, LLP

[57] ABSTRACT

A storage device provides for the secure storage of a gun in a vehicle, includes a rectangular base plate and a box-like cover having a rectangular top and sidewalls that form a chamber for storing a gun. The sidewalls enclose a rectangular area that corresponds substantially to the area of the base plate so that the cover forms a close fit around the base plate, which has a planar central portion joined to and surrounded by upwardly bent elongated edge portions. The base plate and cover each include an aperture, each slightly offset from a center point of the base plate central portion and top cover, respectively, but in vertical alignment with each other and with an aperture formed by the trigger guard of a gun stored in the device. The storage device also includes a rotatable pin that is sized to pass through the apertures in the base plate and cover and through the trigger guard of a gun stored in the device. At its plate end, the pin is provided with a base large enough to prevent its passage through the aperture in the plate. The pin is inserted in the plate aperture and extends through the trigger guard of a gun in the storage chamber and through the aperture in the cover. At its cover end, the pin has a transverse bore that accommodates the shank of a portable lock. Locking the lock in the bore of the pin after it has passed through the plate aperture, trigger guard, and cover aperture secures the gun within the storage device.

10 Claims, 6 Drawing Sheets

GUN STORAGE DEVICE

CROSS-REFERENCE TO RELATED APPLICATION

This application claims priority from Provisional application Ser. No. 60/054,681, STORAGE DEVICE FOR HANDGUNS AND VALUABLES, Thomas H. Standish, applicant, filed Aug. 4, 1997.

FIELD OF THE INVENTION

The present invention relates to a device for the safe storage of guns in a vehicle.

BACKGROUND OF THE INVENTION

Handguns have been stored in vehicles in various ways. Sometimes they are simply placed under the driver seat or in a glove compartment, where they are highly susceptible to theft. To prevent such theft, a device for securely storing a gun within a vehicle would be very desirable.

A variety of devices for storing handguns are known in the art, including those described in the following patents:

U.S. Pat. No. 4,721,205 to Burt et al. describes a gun container having a hollow base portion for holding a handgun and a cover that fits over the base portion. The cover is provided with inwardly projecting pins that engage and transverse U-shaped grooves in the base portion when the cover is manipulated sequentially downward, forward, and upward with respect to the base portion.

U.S. Pat. No. 4,788,838 to Cislo describes a lockbox for pistols having two housings joined by a hinge. A first latch locks the housings together to secure the pistol in the box; a second latch releasably secures the box to a stationary object such as a bed frame.

U.S. Pat. No. 4,890,466, also to Cislo, describes a lockbox for pistols having two connected housings that can be locked together and a bracket for securing the box to a stationary object. The bracket is attached to one of the housings and can only be detached from the stationary object when the box is open.

U.S. Pat. No. 5,168,994 to Beletsky et. al. describes a gun storage container having a hinged lockable cover for opening the end of the container nearest to the grip of a handgun stored therein. Fixtures within the container engage the barrel portion and a second portion of the gun and enables it to be withdrawn from the container when the cover is opened.

U.S. Pat. No. 5,236,086 to MacTaggert describes a gun storage having a locking bar within the container. The locking bar has a first unlocked position and a second locked position, and the bar can be moved from the locked to the unlocked position only when a release switch within the container is pressed by the exertion of a predetermined pressure.

U.S. Pat. No. 5,375,440 to Patterson describes a portable storage container for a handgun that is a plastic rectangular container that is lockable by means of a shank extending through the container and lid and provided with a bore that accommodates a padlock.

These and other devices described in the art are often expensive, or inconvenient, or unsuited for use in a vehicle. The device of the present invention meets the needs for the convenient, inexpensive storage of guns in a vehicle.

SUMMARY OF THE INVENTION

The device of the present invention, which provides for the secure storage of a gun in a vehicle, includes a rectangular base plate and a box-like cover having a rectangular top and sidewalls that form a chamber for storing a gun. The sidewalls enclose a rectangular area that corresponds substantially to the area of the base plate so that the cover forms a close fit around the base plate, which has a planar central portion joined to and surrounded by upwardly bent elongated edge portions.

The base plate and cover each include an aperture, in with each other and with an aperture formed by the trigger guard of a gun stored in the device.

The storage device also includes a rotatable pin that is sized to pass through the apertures in the base plate and cover and through the trigger guard of a gun stored in the device. At its plate end, the pin is provided with a base large enough to prevent its passage through the aperture in the plate. The pin is inserted in the plate aperture and extends through the trigger guard of a gun in the storage chamber and through the aperture in the cover. At its cover end, the pin has a transverse bore that accommodates the shank of a removable lock. Locking the lock in the bore of the pin after it has passed through the plate aperture, trigger guard, and cover aperture secures the gun within the storage device.

DETAILED DESCRIPTION OF THE INVENTION

Figure 1:
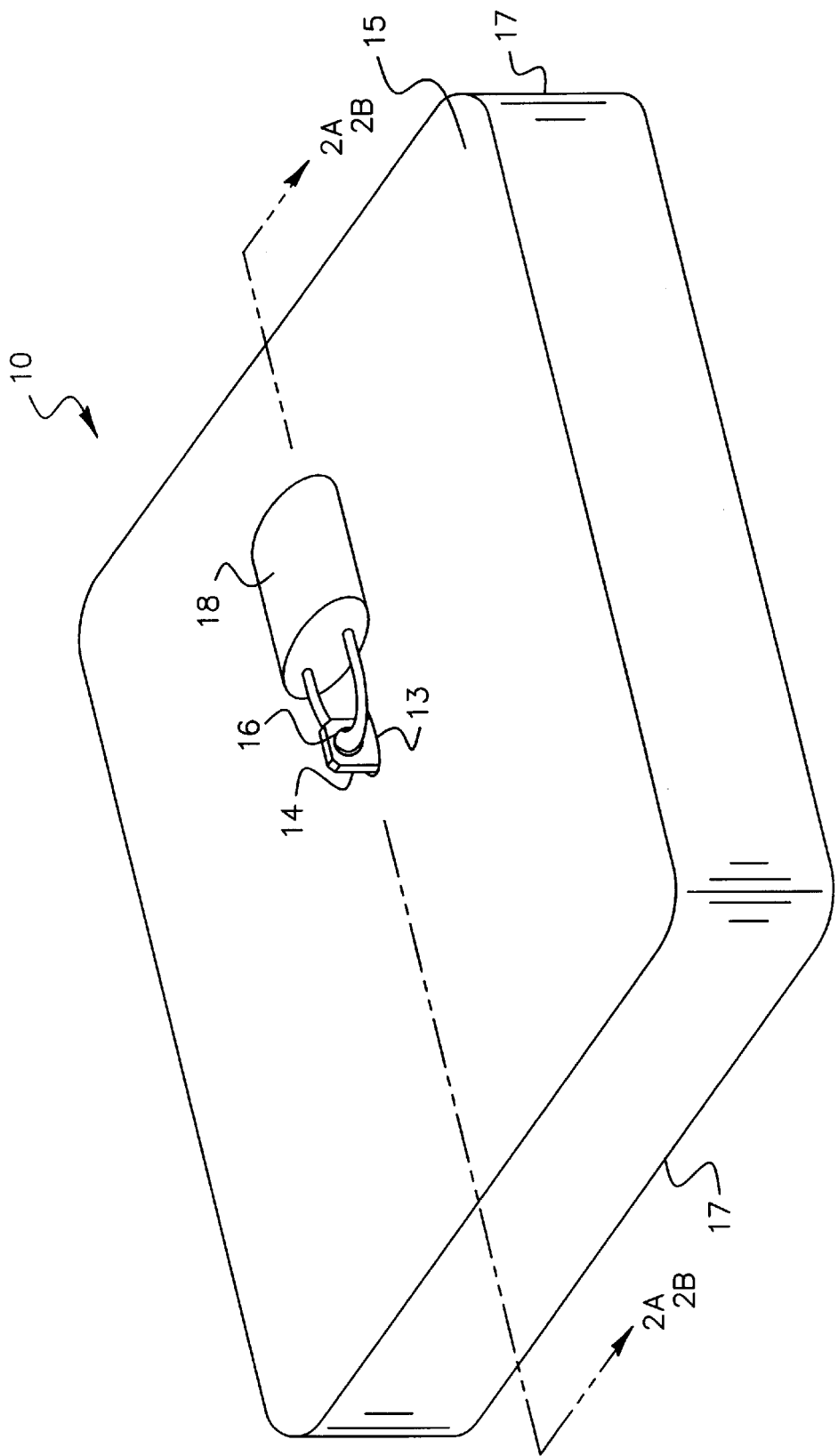
FIG. 1 is a top isometric view of the device of present invention.

FIG. 1 shows a gun storage device 10 that safely stores a gun in a vehicle (not shown). Device 10 includes a cover 12 that has a second aperture 13, a rotatable locking pin 14 with a bore 16, and a removable lock 18, for example, a highly secure Master™ padlock or a shackleless lock, that fits into bore 16 to lock device 10. Cover 12 comprises a substantially rectangular top 15 connected to sidewalls 17 that enclose a rectangular area corresponding to that of a base plate 22 to be described.

Figure 2A:
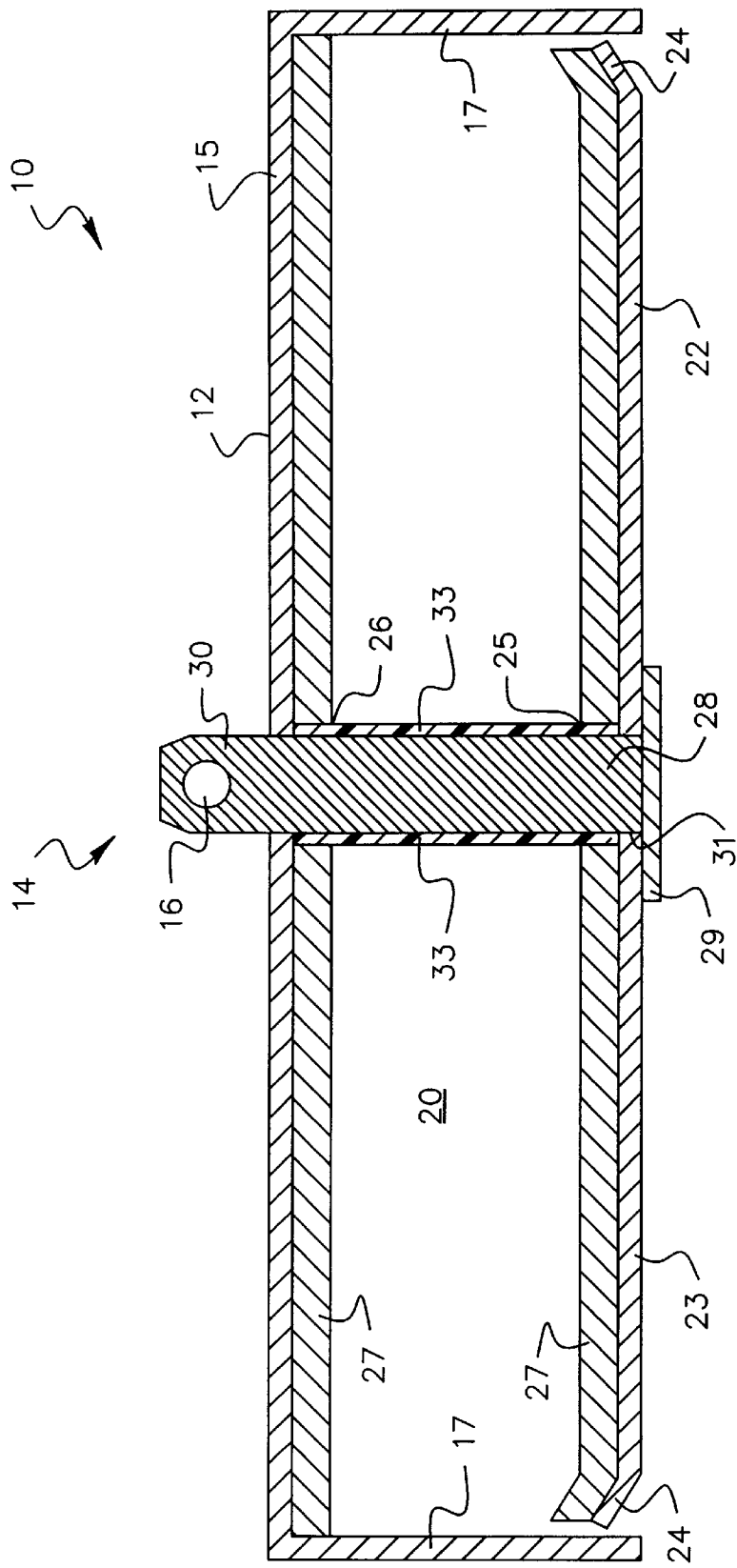
FIGS. 2A and 2B are cross-sectional view of FIG. 1 taken along the line of 2—2.

As shown in FIG. 2A, cover 12 is a box-like container having a rectangular top 15 connected to sidewalls 17 and forming a storage chamber 20 for a gun (not shown). Sidewalls 17 of cover 12 form a close fit around base plate 22, which comprises a planar central portion 23 and upwardly bent elongated edge portions 24 joined to and surrounding central portion 23. Edge portions 24, being fully covered by sidewalls 17 as shown, prevent a prying tool from obtaining sufficient "bite" between base plate 22 and cover 12. Upwardly bent portions 24 also prevent rotation of cover 12 with respect to base plate 20 in the event of slight upward play in cover 12 when device 10 is locked. Base plate 20 and cover 12 are each provided with an aperture, first aperture 25 and second aperture 26, respectively, that are in vertical alignment with one another and with the aperture formed by the trigger guard of a gun (not shown) stored in chamber 20.

Base plate 20 and cover 12 preferably are made of a hardened steel, for example, 11 gauge steel plate. Base plate 20 and cover 12 can be coated on their interior surfaces with a layer of protective material 27, which can be cushioning material such as an egg shell foam or a bullet proof material, for example, Kevlar™.

Figure 2B:
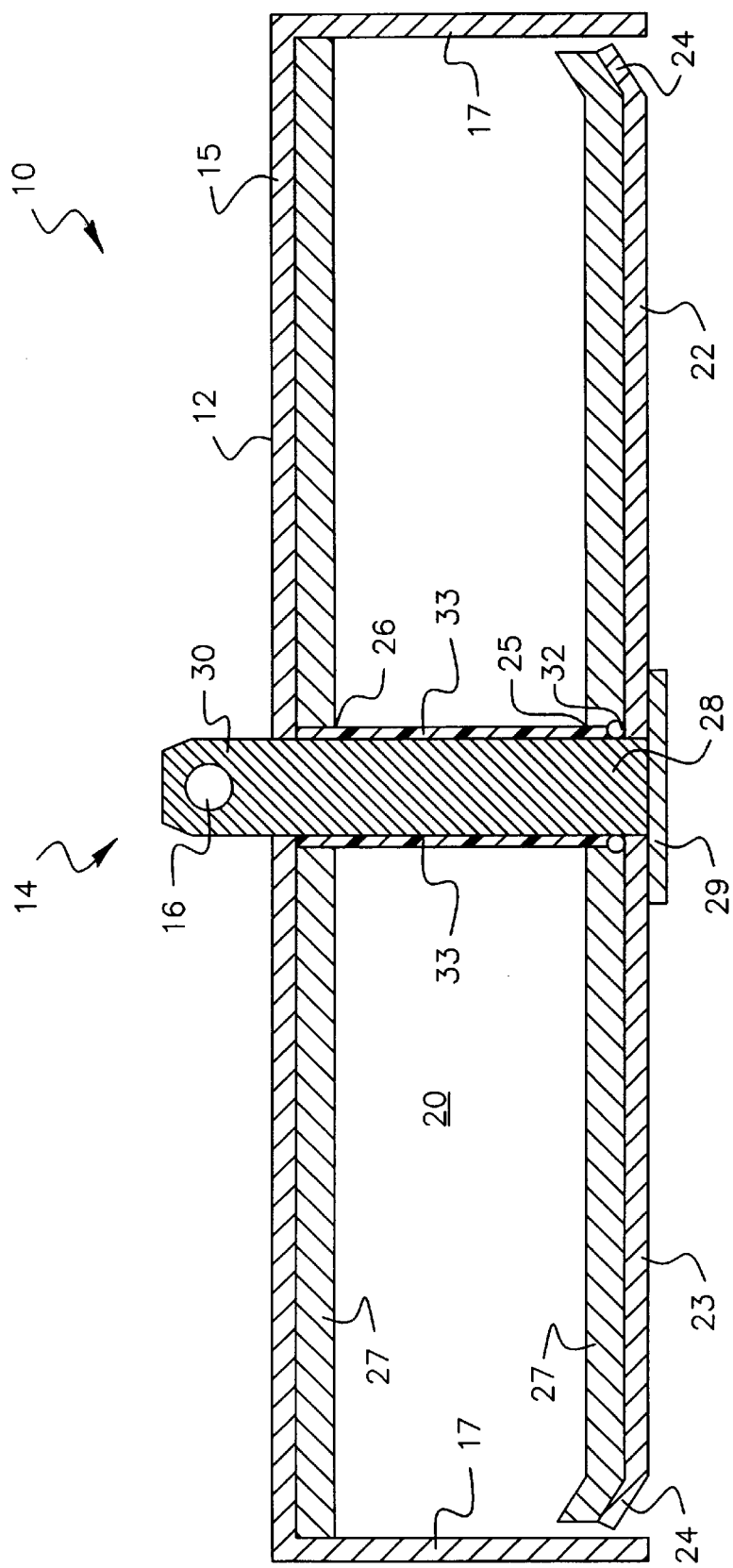

Rotatable pin 14 is provided at its plate end 28 with a base 29 that is wider than first aperture 25 and at its cover end 30 with transverse bore 16. Pin 14 is rotatable within first aperture 25 and can be held in position by a circumferential groove 31 adjacent to base 29. Alternatively, as shown in FIG. 2B, pin 14 can be provided with a retaining clip 32. Pin 14 is also rotatable within second aperture 26 when cover 12 is put in place over base plate 22. The rotatability of pin 14 prevents it from being readily bent or broken during an attempt to break into device 10. As shown in FIGS. 2A and 2B, pin 14 can also be coated or covered by sleeve 33 of plastic material to prevent scratching of the trigger guard of the handgun.

Figure 3:
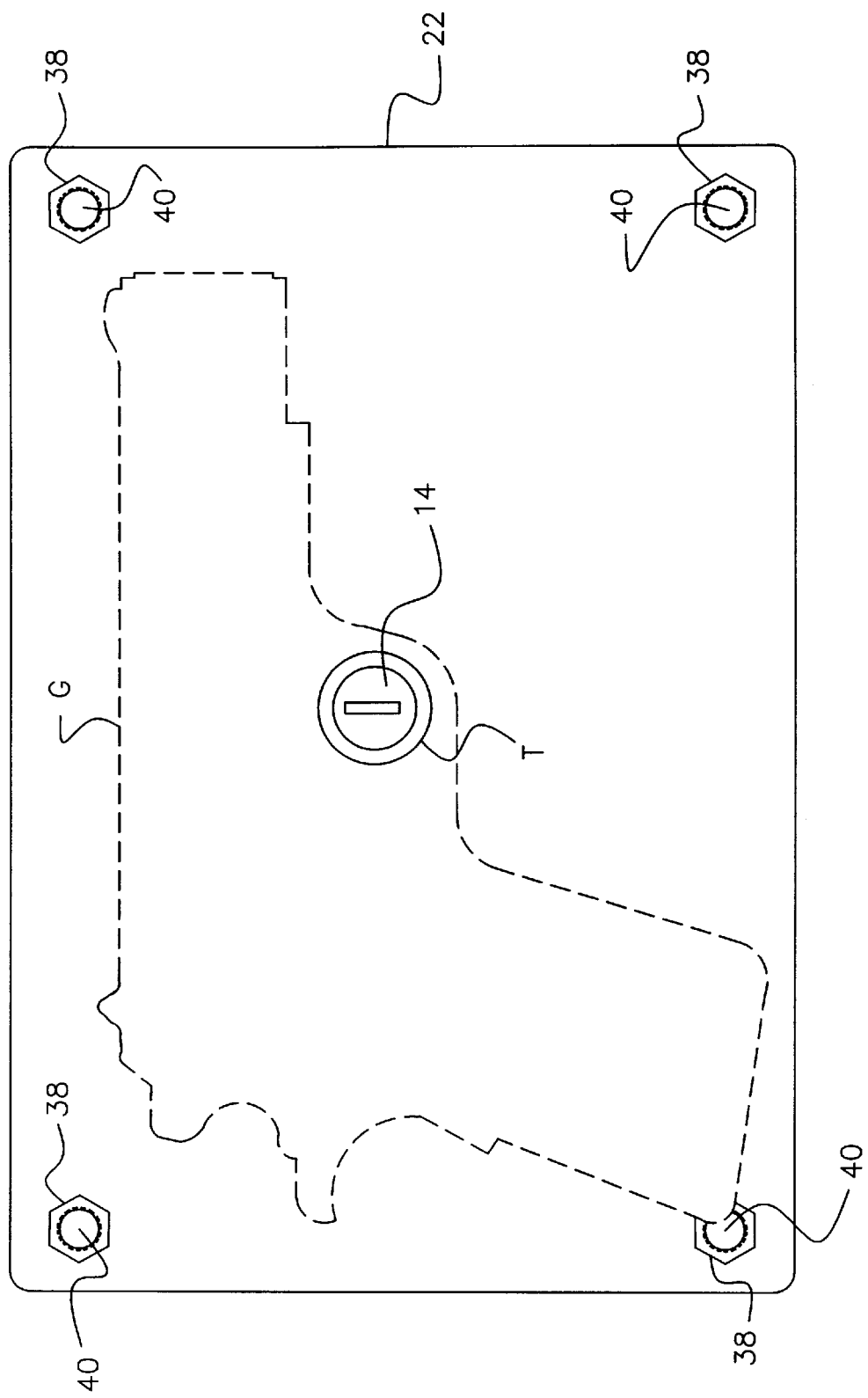
FIGS. 3 and 4 are top perspective views of FIG. 1 with the cover removed, showing a handgun stored in the device.

As shown in FIG. 3, a gun G, such as a handgun is placed on base plate 22. Pin 14 passes through trigger guard T of gun G and subsequently through second aperture 26 of cover 12 (not shown). Base plate 22 is secured to a vehicle (not shown) by inserting fasteners such as bolts 38 through holes 40.

Figure 4:
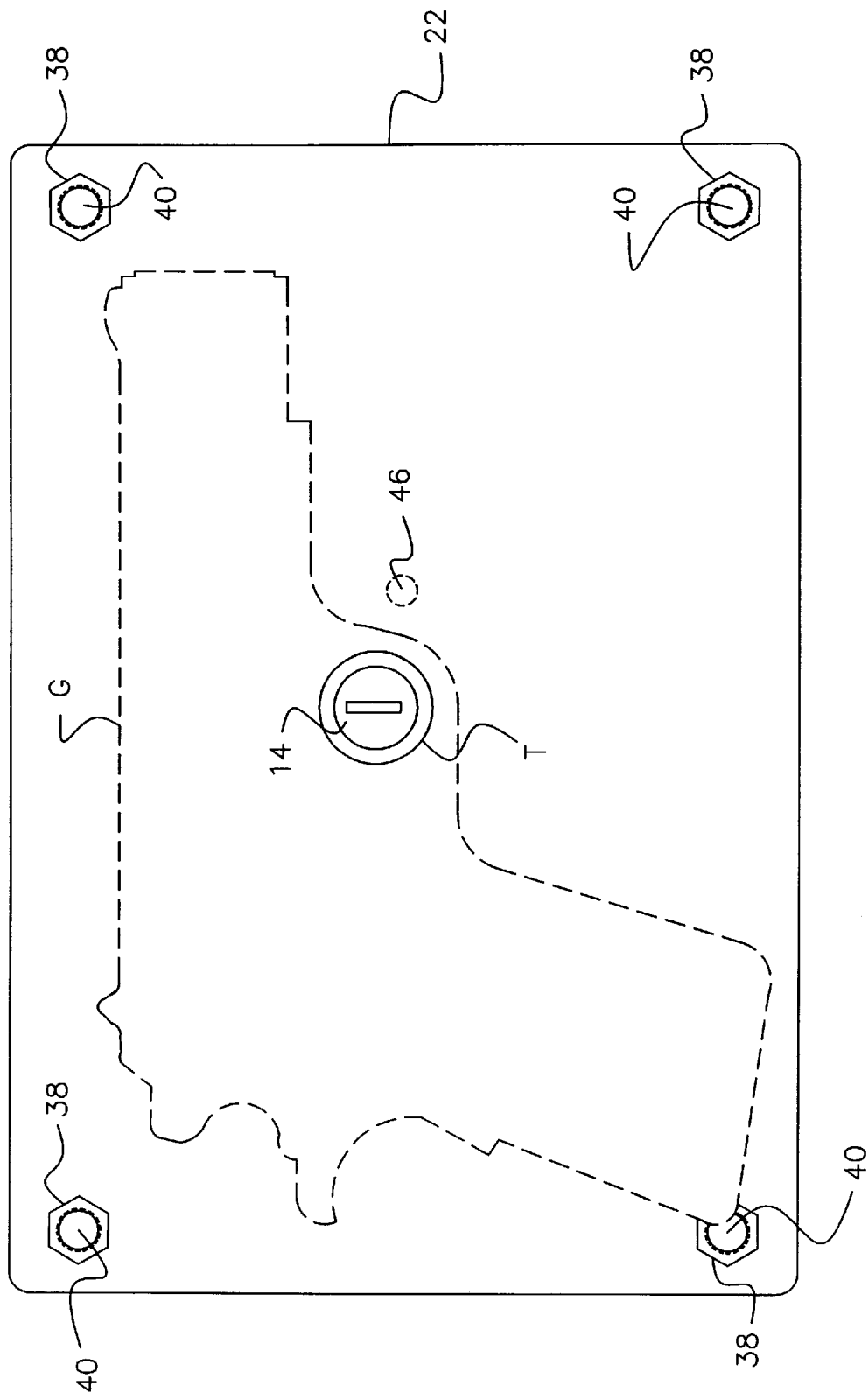

In addition to the features depicted in FIG. 3, FIG. 4 shows an optional stop 46 that retains gun G in place and prevents it from accidentally discharging. Stop 46 can be mounted vertically on base plate 22 a short distance, sufficient to permit insertion of pin 14 through trigger guard T of gun G, from first aperture 25.

As depicted in FIGS. 3 and 4, pin 14 is located in a position slightly offset from the center of the base plate 22 and from the center of cover 12. Apertures 25 and 26, which are in vertical alignment with one another, are slightly offset from the center points of base plate central portion 23 and cover top 15, respectively. This offset positioning of apertures 25 and 26, and consequently of pin 14, permits the minimization of the dimensions of storage device 10 while enabling the secure storage of a large number of the most commonly available handguns. A device 10 having interior dimensions of about 6⅞×10⅝×2¼ inches can accommodate a variety of handguns having barrel lengths of 4 inches or less, for example, Beretta, Glock, and 0.357 magnum pistols. Depending on the profile of the particular gun, its orientation in device 10 can be the reverse of that depicted for gun G in FIGS. 3 and 4. Pin 14 in a device having the specified dimensions can have a diameter of about ⅝ inch, and bore 16 can accommodate a lock having a ⅜ inch diameter shank. The distance between pin 14 and stop 46 can be approximately ¼ inch. The displacement of the position from the center of chamber 20 in device 10 can be about ½ inch in the lengthwise dimension and about ⅜ inch in the widthwise direction. The chamber 20 of device 10 is sufficiently large to allow storage of a clip or ammunition for a gun G.

Figure 5:
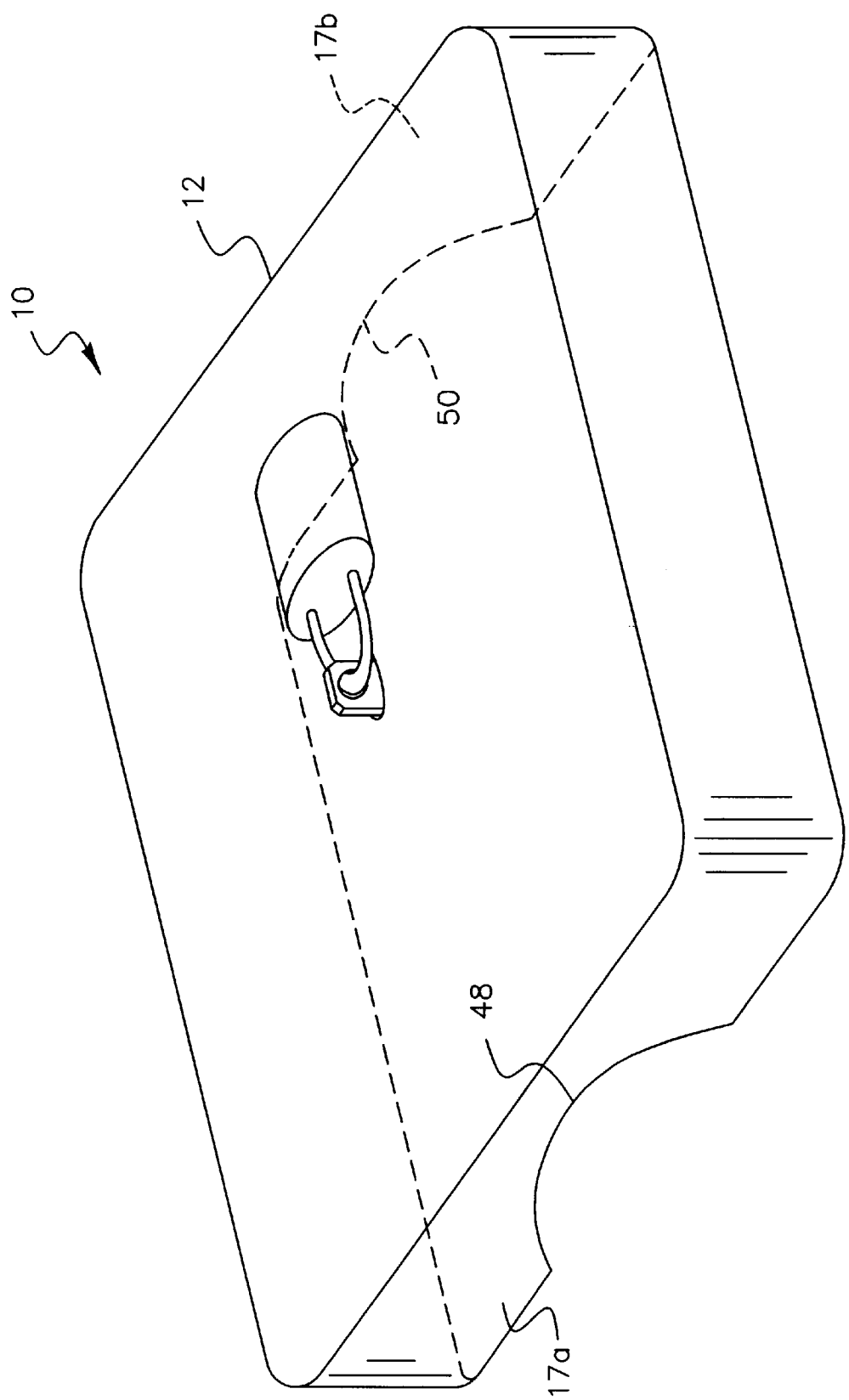
FIG. 5 is a top isometric view of the device of the invention provided with apertures in opposing sidewalls of the cover.

As shown in FIG. 5, cover 12 can have two apertures 48 and 50 in two opposing sidewalls 17a and 17b, respectively. Openings 48 and 50 allow a long-barreled pistol, rifle or shotgun to be secured in storage device 10.

The device 10 of the present invention can, in addition to its use in a vehicle, provide for the storage of guns in a home, home, where the device be securely fastened to any conveniently located stationary object. The device 10, which is economically fabricated from readily available materials, allows interchangeability of locks, and provides protection of the fasteners used for its installation.

The invention has been described in detail with particular reference to certain preferred embodiments thereof, but it will be understood that variations and modifications can be effected within the spirit and scope of the invention.

What is claimed:

1. A device for securely storing a gun in a vehicle, said device comprising:

a rectangular base plate and fastening means for securely attaching said base plate to the floor or other surface of a vehicle, said base plate having an upper and a lower surface and comprising a substantially planar central portion and upwardly bent elongated edge portions joined to and surrounding said central portion, said base plate comprising a first aperture having a position adopted to be in vertical alignment with an aperture formed by a trigger guard of the gun stored in said device;

a box-like cover comprising a rectangular top and sidewalls defining a storage chamber for the gun, said sidewalls enclosing a rectangular area corresponding substantially to the area of said rectangular base plate, whereby said cover forms a close fit around said base plate and overlaps said edge portion of said base plate; said cover further comprising a second aperture adapted to be in vertical alignment with an aperture formed by a trigger guard of the gun stored in said device and with said first aperture in said base plate;

a rotatable pin sized for passing through an aperture formed by a trigger guard of the gun stored in said device, said pin having a plate end provided with a flat base of sufficient size to prevent its passing through said first aperture and a cover end provided with a transverse bore sized for accepting a shank of a portable lock;

whereby passing said pin sequentially through said first aperture, the trigger guard of the gun within said chamber, and said second aperture, inserting the shank of a lock through said transverse bore, and locking said lock secures the gun within said device.

2. The device of claim 1 wherein said base plate, cover, and pin are each formed of hardened steel.

3. In combination with the device of claim 1, a gun stored in said device.

4. The device of claim 1 wherein said fastening means comprise a plurality of holes extending through said base plate and a corresponding plurality of bolts.

5. The device of claim 1 further comprising a stop disposed orthogonally to and connected to said central portion of the base plate, said stop further restricting movement of the gun stored within said device.

6. The device of claim 1 wherein said first and second apertures are slightly offset from a center point of said base plate and said rectangular top of said cover.

7. The device of claim 1 further comprising a layer of protective material disposed on the upper surface of said base plateand on said cover within said storage chamber.

8. The device of claim 7 wherein said protective material comprises a foam cushioning material.

9. The device of claim 1 further comprising corresponding apertures in two opposing sidewalls of said cover.

10. The device of claim 1 further comprising a retaining clip encompassing said rotatable pin, said retaining clip being in contact with the upper surface of said base plate.

* * * * *